US008254629B1

(12) United States Patent
Dhawan (10) Patent No.: US 8,254,629 B1
(45) Date of Patent: Aug. 28, 2012

(54) METHODS AND APPARATUS FOR MEASURING IMAGE STABILITY IN A VIDEO

(75) Inventor: Anuj Dhawan, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 1035 days.

(21) Appl. No.: 12/198,303

(22) Filed: Aug. 26, 2008

(51) Int. Cl.
*G06K 9/00* (2006.01)

(52) U.S. Cl. .................................................. 382/103

(58) Field of Classification Search .............. 382/103, 382/107, 255; 348/169, 207.1, 207.11, 208.99, 348/208.1–208.5, 208.14; 386/242, 278, 386/281
See application file for complete search history.

(56) References Cited

U.S. PATENT DOCUMENTS

| | | | | |
|---|---|---|---|---|
| 4,853,775 | A * | 8/1989 | Rouvrais et al. | 348/699 |
| 6,229,570 | B1 * | 5/2001 | Bugwadia et al. | 348/441 |
| 2002/0131510 | A1 * | 9/2002 | Lin | 375/240.27 |
| 2005/0280657 | A1 * | 12/2005 | Hori et al. | 345/619 |
| 2007/0211914 | A1 * | 9/2007 | Buehler | 382/100 |
| 2007/0236561 | A1 * | 10/2007 | Anai et al. | 348/46 |
| 2008/0002771 | A1 * | 1/2008 | Chen | 375/240.16 |
| 2008/0037840 | A1 * | 2/2008 | Steinberg et al. | 382/118 |
| 2008/0094479 | A1 * | 4/2008 | Yost et al. | 348/208.99 |

OTHER PUBLICATIONS

IStabilize 2.2.4—Video (shaky motion) stabilizer, iStabilize for Mac—Video (shaky motion) stabilizer. Mac Update.com, web page available at http://www.macupdate.com/app/mac/14997/instabilize, as available via the Internet and printed Apr. 5, 2012.
"Chapter 1: Introduction", web page available at http://www.ces.clemson.edu/~stb/klt/user/chpt1/html, as available via the Internet and printed Apr. 5, 2012.
Lee, Shih-Hung et al., "Home Video Content Analysis for MTV-Style Video Generation", Integrated Media Systems Center and Development of Electrical Engineering, University of Southern California, web page at http://viola.usc.edu/Research/shihhunl_ShihhungEL2005final.pdf, Dec. 2005.

* cited by examiner

*Primary Examiner* — Jason M Repko
*Assistant Examiner* — Shervin Nakhjavan
(74) *Attorney, Agent, or Firm* — Kilpatrick Townsend & Stockton LLP

(57) ABSTRACT

A system identifies a change in a position of an object from a first frame to a second frame from a plurality of frames. The video is comprised of a plurality of frames. In one embodiment, the plurality is at least three frames. The image stability measuring process identifies a change in direction of the change in the position of the object. The change in direction is determined by utilizing a plurality of adjacent frames located near the first frame and the second frame. The image stability measuring process determines an image stability value for a subset of the plurality of frames. The image stability value is calculated based on the change in direction. The image stability measuring process renders a portion of the video within an automatic editing script. The portion of the video is selected based on a preferred image stability value identified within the automatic editing script.

20 Claims, 11 Drawing Sheets

145
VIDEO 150-1
155-1

204 IN A VIDEO COMPRISING A PLURALITY OF FRAMES, IDENTIFY A CHANGE IN A POSITION OF AN OBJECT FROM A FIRST FRAME TO A SECOND FRAME FROM THE PLURALITY OF FRAMES ACROSS A FIRST FRAME AND A SECOND FRAME

205 ATTRIBUTE THE CHANGE IN POSITION TO THE SECOND FRAME, THE CHANGE IN POSITION ASSIGNED TO THE SECOND FRAME DETERMINED BY UTILIZING A FIRST FRAME, THE SECOND FRAME FOLLOWING THE FIRST FRAME WITHIN A SEQUENCE OF FRAMES WITHIN THE VIDEO, THE AT LEAST TWO FRAMES COMPRISING THE FIRST FRAME AND THE SECOND FRAME

206 REPEAT THE STEPS OF IDENTIFYING A CHANGE IN POSITION AND ATTRIBUTING THE CHANGE, THE STEPS PERFORMED ACROSS THE SECOND FRAME AND A THIRD FRAME, THE THIRD FRAME FOLLOWING THE SECOND FRAME WITHIN THE SEQUENCE OF FRAMES WITHIN THE VIDEO, WHEREIN THE CHANGE IN POSITION IS ATTRIBUTED TO THE THIRD FRAME

*FIG. 4*

207 IN A VIDEO COMPRISING A PLURALITY OF FRAMES, IDENTIFY A CHANGE IN A POSITION OF AN OBJECT FROM A FIRST FRAME TO A SECOND FRAME FROM THE PLURALITY OF FRAMES ACROSS A FIRST FRAME AND A SECOND FRAME

208 MAINTAIN AN OBJECT COUNTER ASSOCIATED WITH THE OBJECT, THE OBJECT COUNTER IDENTIFYING A NUMBER OF TIMES THE OBJECT EXISTS ACROSS THE PLURALITY OF FRAMES

209 COMPILE A LIST OF PREFERRED OBJECTS, THE LIST IDENTIFYING OBJECTS ASSOCIATED WITH HIGH VALUE OBJECT COUNTERS, THE HIGH VALUE OBJECT COUNTERS DETERMINED FROM A PLURALITY OF OBJECT COUNTERS CALCULATED FOR OBJECTS LOCATED ON THE PLURALITY OF FRAMES

OR

210 DETERMINE THE OBJECT EXISTS WITHIN THE FIRST FRAME

211 DETERMINE THE OBJECT DOES NOT EXIST WITHIN THE SECOND FRAME

212 DELETE THE OBJECT COUNTER ASSOCIATED WITH THE OBJECT

*FIG. 5*

213 IDENTIFY A CHANGE IN DIRECTION OF THE CHANGE IN THE POSITION OF THE OBJECT, THE CHANGE IN DIRECTION DETERMINED BY UTILIZING A PLURALITY OF ADJACENT FRAMES LOCATED NEAR THE FIRST FRAME AND THE SECOND FRAME

214 OBTAIN A LIST OF PREFERRED OBJECTS INDICATING OBJECTS OCCURRING FREQUENTLY ACROSS THE PLURALITY OF FRAMES

215 FOR EACH PREFERRED OBJECT IDENTIFIED IN THE LIST OF PREFERRED OBJECTS, IDENTIFY AN ASSOCIATED FRAME ON WHICH THE PREFERRED OBJECT EXISTS

216 UTILIZE THE ASSOCIATED FRAME TO DETERMINE WHETHER THE POSITION OF THE OBJECT HAS CHANGED DIRECTION ACROSS A SUB SET OF FRAMES CONTIGUOUS TO THE ASSOCIATED FRAME

*FIG. 6*

216 UTILIZE THE ASSOCIATED FRAME TO DETERMINE WHETHER THE POSITION OF THE OBJECT HAS CHANGED DIRECTION ACROSS A SUB SET OF FRAMES CONTIGUOUS TO THE ASSOCIATED FRAME

217 IDENTIFY THE ASSOCIATED FRAME AND THE SUB SET OF FRAMES AS A FIRST FRAME, A SECOND FRAME AND A THIRD FRAME

218 PLOT A LOCATION OF THE PREFERRED OBJECT ON THE FIRST FRAME AND THE SECOND FRAME

219 IDENTIFY A FIRST PLANE BETWEEN THE LOCATION OF THE PREFERRED OBJECT ON THE FIRST FRAME AND THE SECOND FRAME

220 PLOT THE PREFERRED OBJECT ON THE THIRD FRAME

221 IDENTIFY A SECOND PLANE BETWEEN THE PREFERRED OBJECT ON THE SECOND FRAME AND THE PREFERRED OBJECT ON THE THIRD FRAME

222 CALCULATE A DIFFERENCE IN DEGREES BETWEEN THE FIRST PLANE AND THE SECOND PLANE

223 DETERMINE THE POSITION OF THE PREFERRED OBJECT HAS CHANGED DIRECTION IF THE DIFFERENCE IN DEGREES IS GREATER THAN A PRE DETERMINED THRESHOLD

224 IDENTIFY THE PREDETERMINED THRESHOLD AS NINETY DEGREES

*FIG. 7*

225 DETERMINE AN IMAGE STABILITY VALUE FOR A SUBSET OF THE PLURALITY OF FRAMES, THE IMAGE STABILITY VALUE CALCULATED BASED ON THE CHANGE IN DIRECTION

226 DETERMINE THE IMAGE STABILITY VALUE BY IDENTIFYING FRAMES HAVING A PLURALITY OF OBJECTS DETERMINED TO HAVE CHANGED DIRECTION, THE NUMBER OF OBJECTS IN THE PLURALITY OF OBJECTS IDENTIFIED HAS HAVING EXCEEDED A CHANGE IN DIRECTION THRESHOLD

227 FOR EACH FRAME, OBTAIN A NUMBER OF OBJECTS DETERMINED TO HAVE CHANGED DIRECTION WITHIN THE FRAME

228 AVERAGE THE NUMBER OF OBJECTS DETERMINED TO HAVE CHANGED DIRECTION WITHIN EACH FRAME TO DETERMINE THE IMAGE STABILITY VALUE FOR THAT FRAME

229 SMOOTH THE IMAGE STABILITY VALUE ACROSS THE SUBSET OF THE PLURALITY OF FRAMES TO ELIMINATE OUTLIER DATA

238 RENDER A PORTION OF THE VIDEO WITHIN AN AUTOMATIC EDITING SCRIPT, THE PORTION OF THE VIDEO SELECTED BASED ON A PREFERRED IMAGE STABILITY VALUE IDENTIFIED WITHIN THE AUTOMATIC EDITING SCRIPT

239 CONFIGURE THE AUTOMATIC EDITING SCRIPT WITH A DESIRED IMAGE STABILITY VALUE SUCH THAT THE AUTOMATIC EDITING SCRIPT SELECTS THE PORTION OF THE VIDEO COMPRISING A PLURALITY OF FRAMES HAVING AN ASSOCIATED IMAGE STABILITY VALUE MATCHING THE DESIRED IMAGE STABILITY VALUE

FIG. 11

METHODS AND APPARATUS FOR MEASURING IMAGE STABILITY IN A VIDEO

BACKGROUND

Conventional computerized technologies (e.g. digital image processing techniques) for measuring image stability in a video involve plotting the position of objects (captured within the video) across a plurality of video frames, and calculating whether the position of those objects has changed direction over the course of the plurality of video frames. Typically, image stability (i.e., "shakiness") is an undesirable feature of video (although not always so). Image stability may be a result of an unsteady hand of an operator holding a video camera. Image stability may also result during use of a zooming feature on a camera, even when the video camera is held steady on a tripod. A person performing video editing (a video editor) may want to be able to identify those portions of a video that are shaky (or not shaky) depending on the purpose of the video editing. For example, a video editor may desire to have shaky video when simulating vintage footage, or to simulate action scenes, such as an explosion. Video editors may also want to identify those portions of the video that are not shaky to select the best portions of the video for editing.

SUMMARY

Conventional computerized technologies for measuring image stability (i.e., "shakiness") in a video suffer from a variety of deficiencies. In particular, conventional technologies for measuring image stability in a video are limited in that conventional technologies (that simply measure a change in direction of an object on the video) do not have the ability to distinguish between image stability in a video and a normal change in direction of the object within the video. In other words, conventional techniques can misinterpret a change in direction of the object as shakiness. For example, within a video of a soccer game, conventional technologies may identify an object (such as a soccer ball) changing direction as period of shakiness. However, this is not an indication of image stability within the video because a soccer ball changes direction many times, within the video, during the normal course of the game. Additionally, conventional technologies identify the entire video as shaky or not shaky, but are not capable of identifying portions of the video as shaky.

Embodiments disclosed herein significantly overcome such deficiencies and provide a system that includes a computer system and/or software executing an image stability measuring process that identifies changes in position of an object within the video. The image stability measuring process identifies whether the change in position of the object is also a change in direction (for that object), and determines an image stability value for the frame on which the object resides. The image stability measuring process distinguishes between normal object movement within the frame and image stability by averaging the number of objects that change direction within each frame, and identifying those frames that have a high image stability value. The image stability measuring process also identifies portions of the video that appear shaky to the naked eye by smoothing the image stability value for each frame using the image stability value of contiguous frames. This eliminates identification of a small number of frames as being shaky when that image stability is not visible to a viewer. This also eliminates portions of video where the change in direction is a normal part of the video, and not evidence of image stability. For example, a video of a pendulum swinging has several frames in which the pendulum (i.e., an object in the video) is identified has having changed direction. By smoothing the image stability value of these frames across a subset of contiguous frames, the frames in which the pendulum changes direction will not be identified has having a high image stability value. Therefore, these frames will not mistakenly be identified as being shaky frames. Accordingly, changes in object direction do not adversely affect the ability of the process and system disclosed herein to properly detect shaky video segments.

In an example embodiment, an image stability value of each frame is calculated and stored within a database. An automatic editing script utilizes the stored image stability values to obtain portions of video to edit. The automatic editing script is configured to select portions of the video that match a predetermined image stability value. For example, the automatic editing script may be configured to select frames of video with a high image stability value to simulate vintage footage.

Embodiments disclosed herein also include a computer system executing an image stability measuring process that identifies a change in a position of an object, in a video, across a first frame 150-1 and a second frame 150-2. The object resides within each of the first frame and the second frame. The video is comprised of a plurality of frames. The image stability measuring process identifies a change in direction of the change in the position of the object. The change in direction is determined by utilizing a plurality of adjacent frames located near the first frame and the second frame. The image stability measuring process determines an image stability value for a subset of the plurality of frames. The image stability value is calculated based on the change in direction. The image stability measuring process renders a portion of the video within an automatic editing script. The portion of the video is selected based on a preferred image stability value identified within the automatic editing script.

During an example operation of one embodiment, the image stability measuring process traverses the plurality of frames within the video, identifying objects on each frame. The image stability measuring process identifies a change in a position of an object located on a frame by comparing the position of the object on the frame with the position of that same object on a previous frame (where the previous frame precedes the frame within the video). If it is determined that an object in the previous frame has changed position from the previous frame to the next frame, then the next frame is identified as containing an object that has changed position. The image stability measuring process continues this process, traversing each of the frames in the video, identifying objects that have changed positions. In other words, the image stability measuring process traverses the frames within the video, comparing each next frame with the previous frame. If a change in position of an object is determined between the previous frame and the next frame, then the change in position of the object is attributed to the next frame.

As the image stability measuring process traverses the plurality of frames within the video, the image stability measuring process maintains an object counter indicating the number of times an object exists across the plurality of frames. In an example embodiment, the image stability measuring process sorts the list of object counters in descending order to identify the object counters with the highest value. Thus, the image stability measuring process identifies those objects that occur most frequently within the plurality of frames. At any moment during the traversal of the plurality of frames, the image stability measuring process maintains information associated with the life of that object across the plurality of frames.

As the image stability measuring process traverses the plurality of frames, the image stability measuring process maintains a list of objects that occur most frequently, and then determines whether those objects have changed direction over the course of the plurality of frames. The image stability measuring process plots a location of an object on the first frame and the second frame. The image stability measuring process identifies a first plane between the location of the object on the first frame and the location of the object on the second frame. The image stability measuring process plots the location of the object on a third frame with respect to the location of the object on the first frame and the location of the object on the second frame. The image stability measuring process identifies a second plane between the object on the second frame and the object on the third frame. An angle exists where the first plane and the second plane meet, and the image stability measuring process calculates a difference in degrees between the first plane and the second plane. In an example embodiment, the image stability measuring process determines the position of the object has changed direction if the difference in degrees is greater than ninety degrees.

The image stability measuring process then determines an image stability value for a subset of the plurality of frames. The image stability measuring process determines the image stability value for a frame by determining the average change in direction for all objects that have changed direction within the frame. A higher value of this average indicates a shaky frame. In other words, a frame with a high number of objects that have changed direction is indicative of a shaky frame.

The image stability measuring process then smoothes the image stability value across the subset of the plurality of frames to eliminate outlier data. The smoothing step eliminates outlier data by smoothing the image stability value across the subset of the plurality of frames to eliminate instances where a high number of objects having changed direction within the frames is not indicative of a shaky frame.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system executing an image stability measuring process that identifies a change in a position of an object, in a video, across a first frame and a second frame. The object resides within each of the two frames. The video is comprised of a plurality of frames. The image stability measuring process identifies a change in direction of the change in the position of the object. The change in direction is determined by utilizing a plurality of adjacent frames located near the first frame and the second frame. The image stability measuring process determines an image stability value for a subset of the plurality of frames. The image stability value is calculated based on the change in direction.

Figure 1:
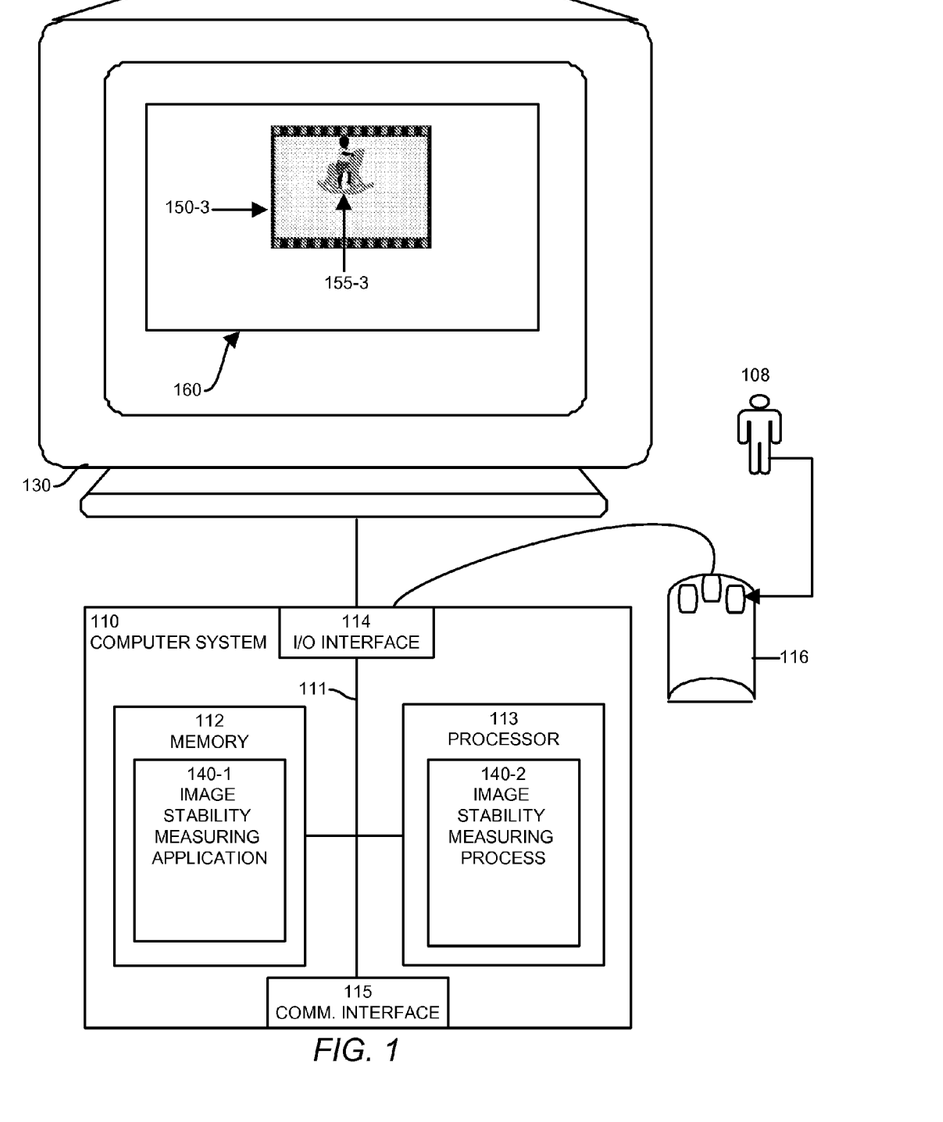
FIG. 1 shows a high-level block diagram of a computer system according to one embodiment disclosed herein.

FIG. 1 is a block diagram illustrating example architecture of a computer system 110 that executes, runs, interprets, operates or otherwise performs an image stability measuring application 140-1 and image stability measuring process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the automatic editing script 160 that the image stability measuring application 140-1 and process 140-2 provides on the display 130. The automatic editing script 160 is configured with a desired image stability value such that the automatic editing script 160 selects portions of the video 145 having an image stability value matching the desired image stability value. Within the automatic editing script 160 is rendered a frame 150-3 containing an object 155-3. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an image stability measuring application 140-1 as explained herein. The image stability measuring application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of an image stability measuring application 140-1. Execution of an image stability measuring application 140-1 in this manner produces processing functionality in image stability measuring process 140-2. In other words, the image stability measuring process 140-2 represents one or more portions or runtime instances of an image stability measuring application 140-1 (or the entire an image stability measuring application 140-1) performing or executing within or upon the processor 113 in the computerized device 110 at runtime.

It is noted that example configurations disclosed herein include the image stability measuring application 140-1 itself (i.e., in the form of un-executed or non-performing logic instructions and/or data). The image stability measuring application 140-1 may be stored on a computer readable medium (such as a floppy disk), hard disk, electronic, magnetic, optical, or other computer readable medium. An image stability measuring application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of an image stability measuring application 140-1 in the processor 113 as the image stability measuring process 140-2. Those skilled in the art will understand that the computer system 110 may include other processes and/or software and hardware components, such as an operating system not shown in this example.

A display 130 need not be coupled directly to computer system 110. For example, the image stability measuring application 140-1 can be executed on a remotely accessible computerized device via the network interface 115. In this instance, the automatic editing script 160 may be displayed locally to a user 108 of the remote computer, and execution of the processing herein may be client-server based.

Figure 2:
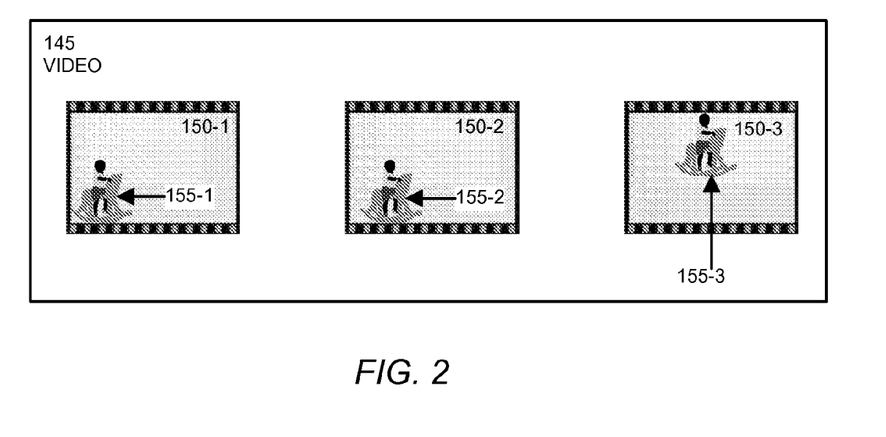
FIG. 2 shows an example video containing a plurality of frames with objects identified within the frames.

FIG. 2 is an example portion of a video 145 containing a plurality of frames 150-N. The plurality of frames 150-N contain a first frame 150-1 containing an object 155-1, a second frame 150-2 containing an object 155-2, and a third frame 150-3 containing an object 155-3. It should be noted that the object 155-1 within frame 150-1 appears to be in the same position as the object 155-2 in frame 150-2. However, the object 155-3 in frame 150-3 appears to be located in a different position than object 155-1 and object 155-2.

Further details of configurations explained herein will now be provided with respect to a flow chart of processing steps that show the high level operations disclosed herein to perform the image stability measuring process 140-2.

Figure 3:
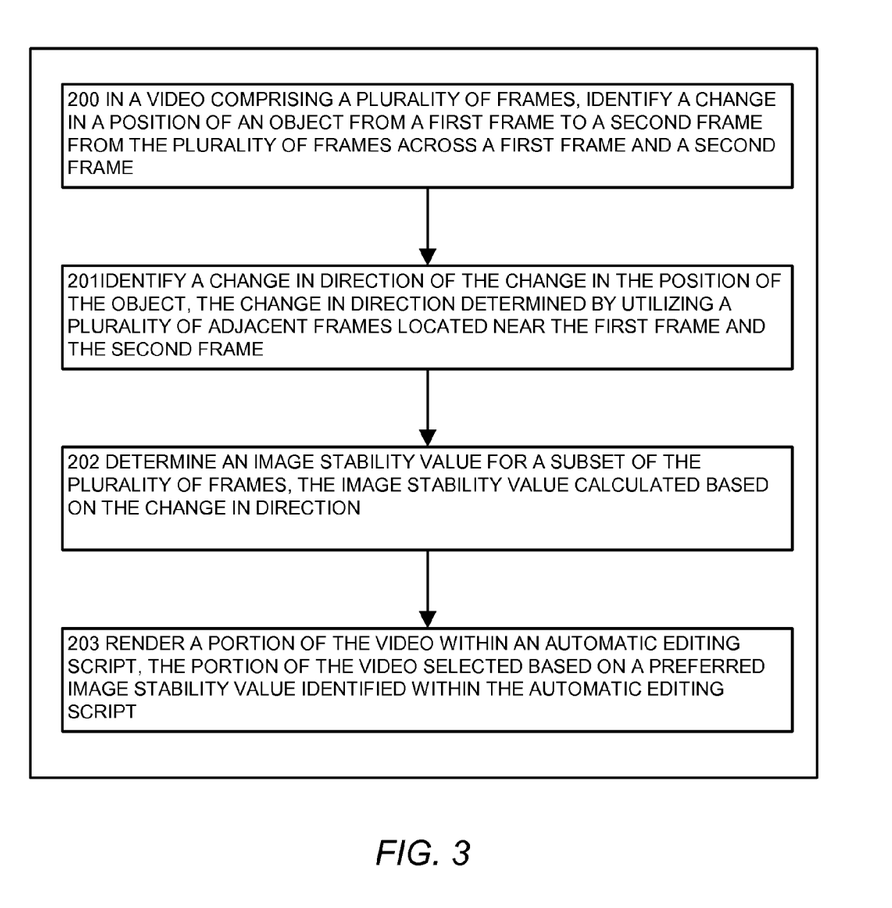
FIG. 3 illustrates a flowchart of a procedure performed by the system of FIG. 1, when the image stability measuring process identifies a change in a position of an object across a first frame and a second frame, according to one embodiment disclosed herein.

FIG. 3 is an embodiment of the steps performed by image stability measuring process 140-2 when it identifies a change in a position of an object 155-1 across a first frame 150-1 and a second frame 150-2.

In step 200, the image stability measuring process 140-2 identifies a change in a position of an object 155-1 across a first frame 150-1 and a second frame 150-2. The object 155-1 resides within the first frame 150-1 and the second frame 150-2. The video 145 is comprised of a plurality of frames 150-N. For example FIG. 2 displays an example plurality of frames 150-N wherein an objects 155-N resides within each of the frames 150-N. In FIG. 2, the objects 155-N within frame 150-1 and frame 150-2 (i.e., object 155-1 and object 155-2) appear to be in the same position across frame 150-1 and frame 150-2. In frame 150-3, however, object 155-3 appears to have changed position when compared to object 155-2 in frame 150-2.

In step 201, the image stability measuring process 140-2 identifies a change in direction of the change in the position of the object 155-1. The change in direction is determined by utilizing a plurality of adjacent frames 150-N located near the first frame 150-1 and the second frame 150-2. For example, a comparison between frame 150-2 and frame 150-3 reveals that the position of the object 155-3 in frame 150-3 has changed position when compared to the position the object 155-2 occupied in frame 150-2.

In step 202, the image stability measuring process 140-2 determines an image stability value for a subset of the plurality of frames 150-N. The image stability value is calculated based on the change in direction. When the image stability measuring process 140-2 determines that an object 155-N in a frame 150-N has changed position, the image stability measuring process 140-2 calculates an image stability value indicating the amount of image stability associated with that frame 150-N. In an example embodiment, the image stability value can be categorized into three categories indicating low, medium and high image stability associated with the frame 150-N. In step 203, the image stability measuring process 140-2 renders a portion of the video 145 within an automatic editing script 160. The portion of the video 145 is selected based on a preferred image stability value identified within the automatic editing script 160. For example, the automatic editing script 160 may be configured to automatically obtain those portions of video 145 that are determined to have a high image stability value, for the purpose of modifying/repairing those portions of the video 145. Or, the automatic editing script 160 may be configured to obtain those portions of the video 145 determined not to be shaky. The automatic editing script 160 may be configured to identify those portions of video 145 determined to have a low image stability value to identify those portions of video 145 that are acceptable for use. In an example embodiment, the image stability value for each frame is stored in a database. The automatic editing script 160 obtains the portions of video 145 based on the image stability value stored in the database.

Figure 4:
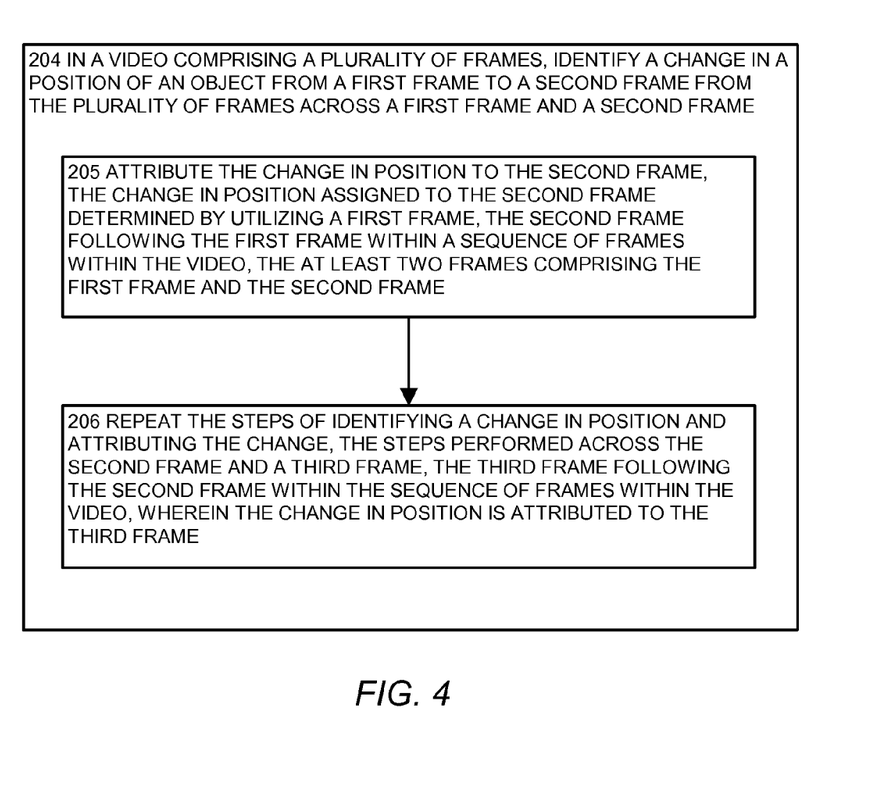
FIG. 4 illustrates a flowchart of a procedure performed by the system of FIG. 1, when the image stability measuring process identifies a change in a position of an object across a first frame and a second frame and attributes the change in position to a second frame, according to one embodiment disclosed herein.

FIG. 4 is an embodiment of the steps performed by image stability measuring process 140-2 when it identifies a change in a position of an object 155-1 across a first frame 150-1 and a second frame 150-2.

In step 204, the image stability measuring process 140-2 identifies a change in a position of an object 155-1 across a first frame 150-1 and a second frame 150-2. The object 155-1 resides within the first frame 150-1 and the second frame 150-2. The video 145 is comprised of a plurality of frames 150-N.

In step 205, the image stability measuring process 140-2 attributes the change in position to a second frame 150-2. The change in position assigned to the second frame 150-2 is determined by utilizing a first frame 150-1. The second frame 150-2 follows the first frame 150-1 within a sequence of frames 150-N within the video 145. In other words, the first frame 150-1 is compared to the second frame 150-2. If it is determined that an object 155-1 in the frame 150-1 has changed position from the first frame 150-1 to the second frame 150-2, then the second frame 150-2 is identified as containing an object 155-2 that has changed position.

In step 206, the image stability measuring process 140-2 repeats the steps of identifying a change in position and attributing the change. The steps are performed across the second frame 150-2 and a third frame 150-3 where the third frame 150-3 follows the second frame 150-2 within the sequence of frames 150-N within the video 145. In other words, the image stability measuring process 140-2 traverses the frames 150-N within the video 145, comparing each next frame 150-3 with the previous frame 150-2. If a change in position of an object 155-2 is determined between the previous frame 150-2 and the next frame 150-3, then the change in position of the object 155-3 is attributed to the next frame 150-3.

Figure 5:
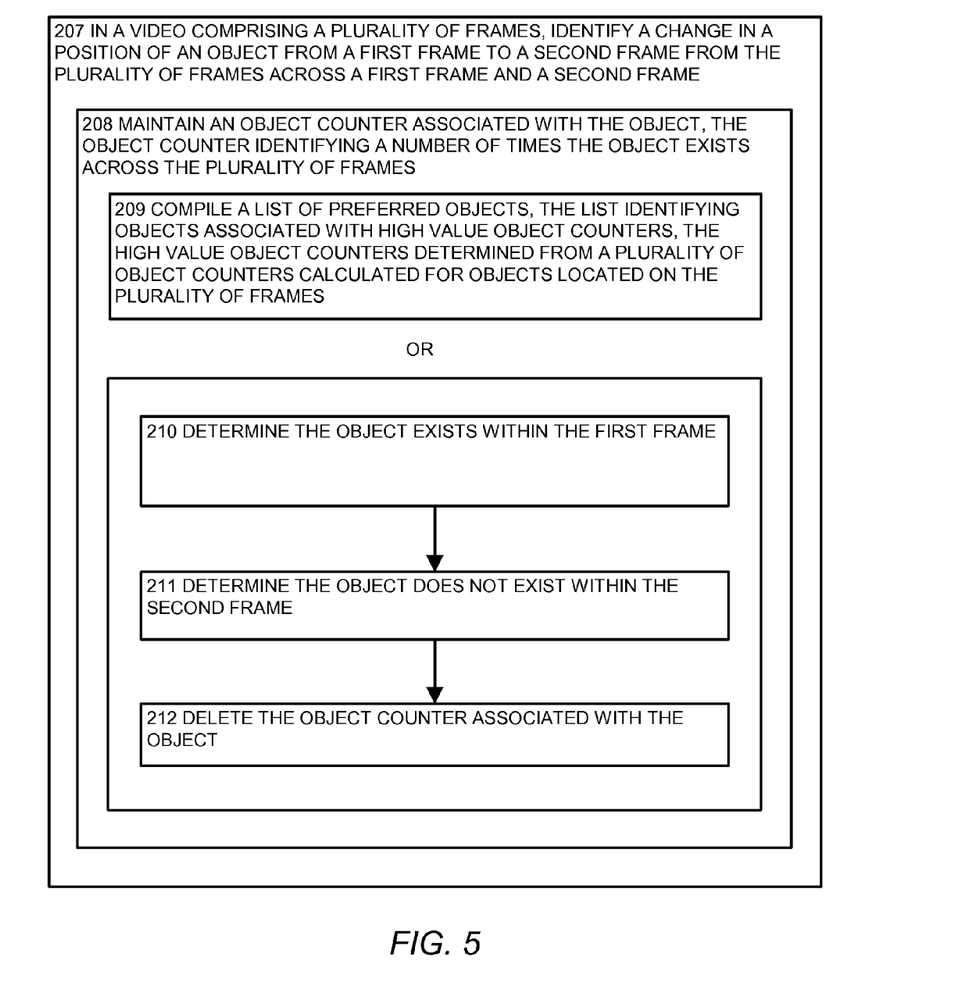
FIG. 5 illustrates a flowchart of a procedure performed by the system of FIG. 1, when the image stability measuring process identifies a change in a position of an object across a first frame and a second frame, and maintains an object counter associated with the object, the object counter identifying the number of times the object exists across the plurality of frames, according to one embodiment disclosed herein.

FIG. 5 is an embodiment of the steps performed by image stability measuring process 140-2 when it identifies a change in a position of an object 155-1 across a first frame 150-1 and a second frame 150-2.

In step 207, the image stability measuring process 140-2 identifies a change in a position of an object 155-1 across a first frame 150-1 and a second frame 150-2. The object 155-1 resides within the first frame 150-1 and the second frame 150-2. The video 145 is comprised of a plurality of frames 150-N.

In step 208, the image stability measuring process 140-2 maintains an object counter associated with the object 155-1. The object counter identifies a number of times the object 155-1 exists across the plurality of frames 150-N. As the image stability measuring process 140-2 traverses the plurality of frames 150-N within the video 145, the image stability measuring process 140-2 maintains an object counter indicating the number of times an object 155-1 exists across the plurality of frames 150-N. In an example embodiment, the image stability measuring process 140-2 maintains an object counter for each object 155-1 identified within the plurality of frames 150-N.

In step 209, the image stability measuring process 140-2 compiles a list of preferred objects 155-N. The list identifies objects 155-N associated with high value object counters, where the high value object counters are determined from a plurality of object counters calculated for objects 155-N located on the plurality of frames 150-N. In other words, as the image stability measuring process 140-2 traverses the plurality of frames 150-N within the video 145, the image stability measuring process 140-2 maintains an object counter for each object 155-1. Each time the image stability measuring process 140-2 discovers the object 155-1 on a frame 150-1, the image stability measuring process 140-2 increments the object counter for that object 155-1. In an example embodiment, the image stability measuring process 140-2 sorts the list of object counters in descending order to identify the object counters with the highest value. Thus, the image stability measuring process 140-2 identifies those objects 155-N that occur most frequently within the plurality of frames 150-N.

Alternatively, in step 210, the image stability measuring process 140-2 determines the object 155-1 exists within a first frame 150-1. As the image stability measuring process 140-2 traverses the plurality of frames 150-N, the image stability measuring process 140-2 maintains a list of objects 155-N that occur most frequently.

In step 211, the image stability measuring process 140-2 determines the object 155-1 does not exist within the second frame 150-2. As the image stability measuring process 140-2 traverses the plurality of frames 150-N, the image stability measuring process 140-2 determines that the object 155-1 that exists on a prior frame 150-1 (or prior frames 150-N) does not exist on the current frame 150-2.

In step 212, the image stability measuring process 140-2 deletes the object counter associated with the object 155-1. In an example embodiment, if the image stability measuring process 140-2 determines that an object 155-1 does not exist on the current frame 150-1, the image stability measuring process 140-2 deletes the object counter associated with that object 155-1. Thus, at any moment during the traversal of the plurality of frames 150-N, the image stability measuring process 140-2 maintains information associated with the life of that object 155-1 across the plurality of frames 150-N.

Figure 6:
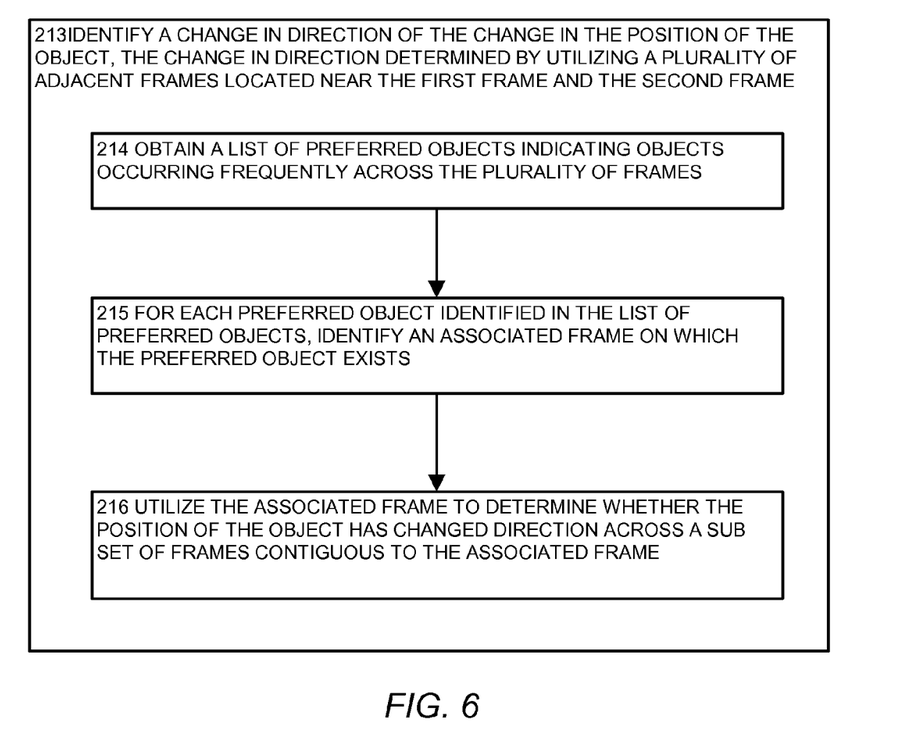
FIG. 6 illustrates a flowchart of a procedure performed by the system of FIG. 1, when the image stability measuring process identifies a change in direction of the change in the position of the object, and obtains a list of preferred objects indicating objects occurring frequently across the plurality of frames, according to one embodiment disclosed herein.

FIG. 6 is an embodiment of the steps performed by image stability measuring process 140-2 when it identifies a change in direction of the change in the position of the object 155-1.

In step 213, the image stability measuring process 140-2 identifies a change in direction of the change in the position of the object 155-1. The change in direction is determined by utilizing a plurality of adjacent frames 150-N located near the first frame 150-1 and the second frame 150-2. The plurality of adjacent frames 150-N may abut the first frame 150-1 and the second frame 150-2, or they may be located near the first frame 150-1 and the second frame 150-2. In an example embodiment, the image stability measuring process 140-2 utilizes changes in position within three adjacent frames 150-N. In other words, the image stability measuring process 140-2 tracks the position of an object 155-1 across a plurality of frames 150-N to determine if the object 155-1 has changed direction over the course of the plurality of frames 150-N. For example, within FIG. 2, the object 155-1 within frame 150-1 appears to be in the same position as the object 155-2 in frame 150-2. However, the object 155-3 in frame 150-3 appears to be located in a different position than object 155-1 and object 155-2.

In step 214, the image stability measuring process 140-2 obtains a list of preferred objects 155-N indicating objects 155-N occurring frequently across the plurality of frames 150-N. The image stability measuring process 140-2 datamines objects 155-N within the plurality of frames 150-N to obtain a list of objects 155-N identified as having changed direction within the respective frames 150-N. As the image stability measuring process 140-2 traverses the plurality of frames 150-N, the image stability measuring process 140-2 maintains a list of objects 155-N that occur most frequently, and then determines whether those objects 155-N have changed direction over the course of the plurality of frames 150-N.

In step 215, for each preferred object 155-1 identified in the list of preferred objects 155-N, the image stability measuring process 140-2 identifies an associated frame 150-1 on which the preferred object 155-1 exists. In an example embodiment, the image stability measuring process 140-2 identifies at least two frames 150-N on which the preferred object 155-N exists. In other words, the image stability measuring process 140-2 identifies objects 155-N that are identified as having change position, and then determines the frames 150-N on which those objects 155-N are identified has having changed direction.

In step 216, the image stability measuring process 140-2 utilizes the associated frame 150-1 to determine whether the position of the object 155-1 has changed direction across a sub set of frames 150-N contiguous to the associated frame 150-1. The image stability measuring process 140-2 tracks the progression of the position of the object 155-1 across a subset of frames 150-N to determine whether the position of that object 155-1 has changed direction over the course of that subset of frames 150-N. In an example embodiment, the image stability measuring process 140-2 determines if a change in direction has occurred (in the change in position of an object) within two adjacent frames 150-N and the associated frame 150-1.

Figure 7:
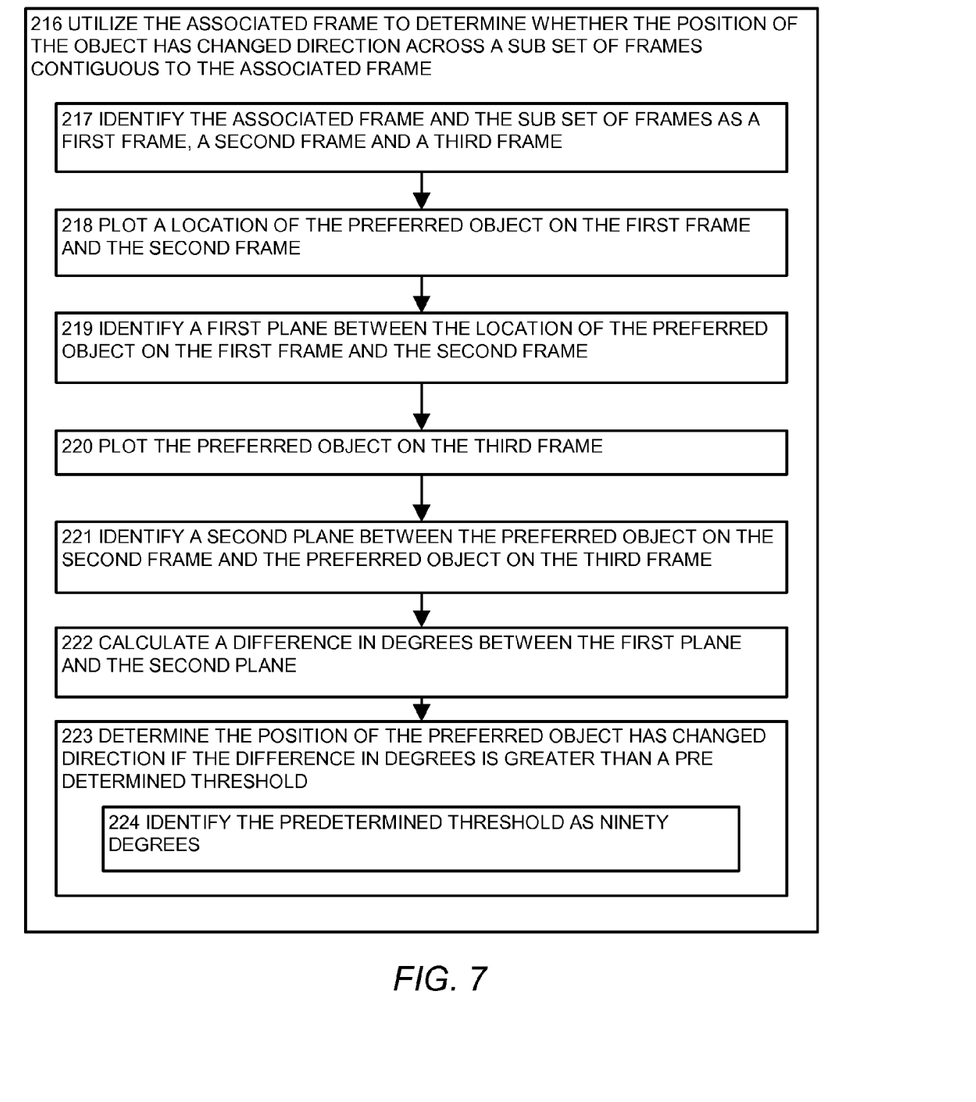
FIG. 7 illustrates a flowchart of a procedure performed by the system of FIG. 1, when the image stability measuring process utilizes the associated frame to determine whether the position of the object has changed direction across a sub set of frames contiguous to the associated frame, according to one embodiment disclosed herein.

FIG. 7 is a continuation of an embodiment of FIG. 6 of the steps performed by image stability measuring process 140-2 when it utilizes the associated frame 150-1 to determine whether the position of the object 155-1 has changed direction across a sub set of frames 150-N contiguous to the associated frame 150-1.

In step 217, the image stability measuring process 140-2 identifies the associated frame 150-1 and the sub set of frames 150-N as a first frame 150-1, a second frame 150-1 and a third frame 150-1. The first frame 150-1 contains object 155-1, the second frame 150-2 contains object 155-2, and the third frame 150-3 contains object 155-3 as shown in FIG. 2.

In step 218, the image stability measuring process 140-2 plots a location of the preferred object 155-1 on the first frame 150-1 and the second frame 150-2. In an example embodiment, the image stability measuring process 140-2 plots the location of the preferred object 155-1 on the first frame 150-1 against the location of the preferred object 155-2 on the second frame 150-2.

In step 219, the image stability measuring process 140-2 identifies a first plane between the location of the preferred object 155-1 on the first frame 150-1 and the location of the preferred object 155-2 on the second frame 150-2.

In step 220, the image stability measuring process 140-2 plots the location of the preferred object 155-3 on the third frame 150-3 with respect to the location of the preferred object 155-1 on the first frame 150-1 and the location of the preferred object 155-2 on the second frame 150-2.

In step 221, the image stability measuring process 140-2 identifies a second plane between the preferred object 155-2 on the second frame 150-2 and the preferred object 155-3 on the third frame 150-3. An angle exists where the first plane and the second plane meet.

In step 222, the image stability measuring process 140-2 calculates a difference in degrees between the first plane and the second plane.

In step 223, the image stability measuring process 140-2 determines the position of the preferred object 155-1 has changed direction if the difference in degrees is greater than a pre determined threshold.

In step 224, the image stability measuring process 140-2 identifies the predetermined threshold as ninety degrees. If the difference in degrees between the first plane and the second plane is greater than 90 degrees, the location of the object 155-1 is determined to have changed direction.

Figure 8:
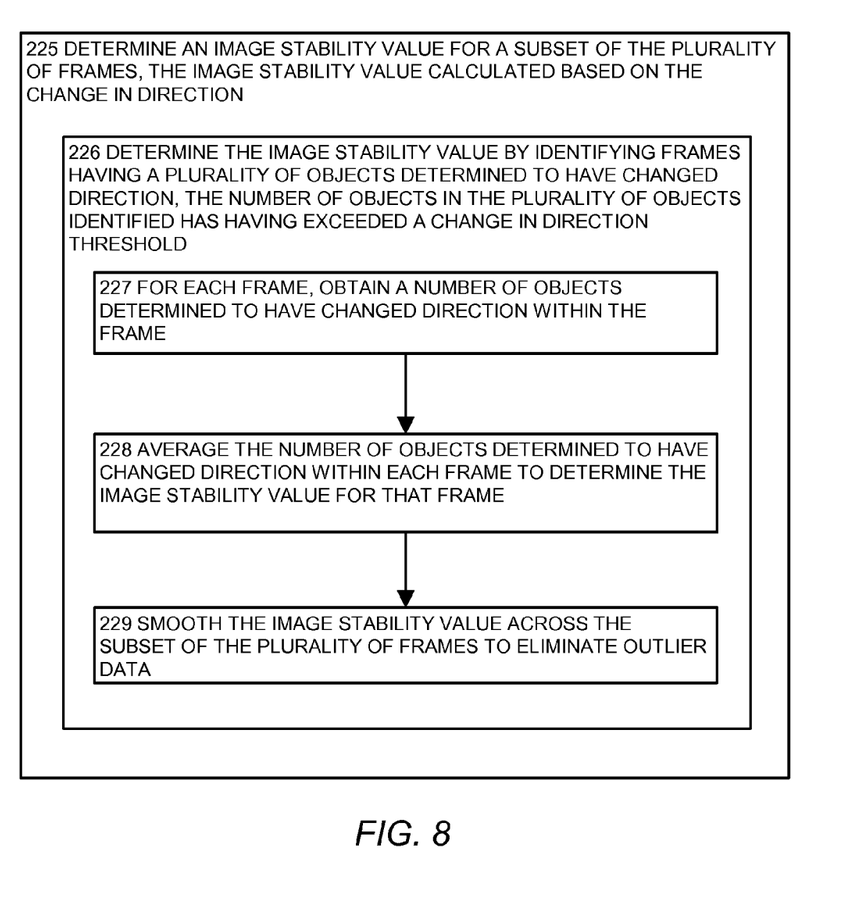
FIG. 8 illustrates a flowchart of a procedure performed by the system of FIG. 1, when the image stability measuring process determines an image stability value for a subset of the plurality of frames, the image stability value calculated based on the change in direction, according to one embodiment disclosed herein.

FIG. 8 is an embodiment of the steps performed by image stability measuring process 140-2 when it determines an image stability value for a subset of the plurality of frames 150-N.

In step 225, the image stability measuring process 140-2 determines an image stability value for a subset of the plurality of frames 150-N. The image stability value is calculated based on the change in direction. In an example embodiment, a first position vector is calculated between frame 150-1 and frame 150-2, and then a second position vector is calculated between frame 150-2 and frame 150-3. The dot product of these two vectors is calculated. If the angle between the first vector and the second vector is greater than ninety degrees, the product is negative, indicating a change in direction for the object 155-1 identified within the frames 150-N.

In step 226, the image stability measuring process 140-2 determines the image stability value by identifying frames 150-N having a plurality of objects 155-N determined to have changed direction. The number of objects 155-N in the plurality of objects 155-N are identified has having exceeded a change in direction threshold. In an example embodiment, the image stability measuring process 140-2 determines the image stability value based on the number of objects 155-N that have changed direction within each frame 150-N.

In step 227, for each frame 150-1, the image stability measuring process 140-2 obtains a number of objects 155-N determined to have changed direction within the frame 150-1. As the image stability measuring process 140-2 traverses the plurality of frames 150-N, the image stability measuring process 140-2 determines the number of objects 155-N within each frame 150-N that have changed direction.

In step 228, the image stability measuring process 140-2 averages the number of objects 155-N determined to have changed direction within each frame 150-1 to determine the image stability value for that frame 150-1. In other words, the image stability measuring process 140-2 averages the number of objects 155-N determined to have changed direction within each frame to obtain an image stability value for that frame. A frame 150-1 with a high number of objects 155-N that have changed direction (from previous, adjacent, frames 150-N) is indicative of a shaky frame 150-1.

In step 229, the image stability measuring process 140-2 smoothes the image stability value across the subset of the plurality of frames 150-N to eliminate outlier data. A subset of frames 150-N may receive a high image stability value (based on a high number of objects 155-N determined to have changed direction within those frames 150-N) but may not necessarily be shaky. For example, a video 145 of a group of leaves sailing in the wind may have a subset of frames 150-N in which a large number of objects 155-N (i.e., leaves) are identified as having changed direction (i.e., when the wind changes direction, the group of leaves will also change direction along with the wind). This change in direction is not an indication of image stability within those frames 150-N. The smoothing step eliminates this outlier data by smoothing the image stability value across the subset of the plurality of frames 150-N to eliminate instances where a high number of objects 155-N having changed direction within the frames is not indicative of a shaky frame 150-N.

Figure 9:
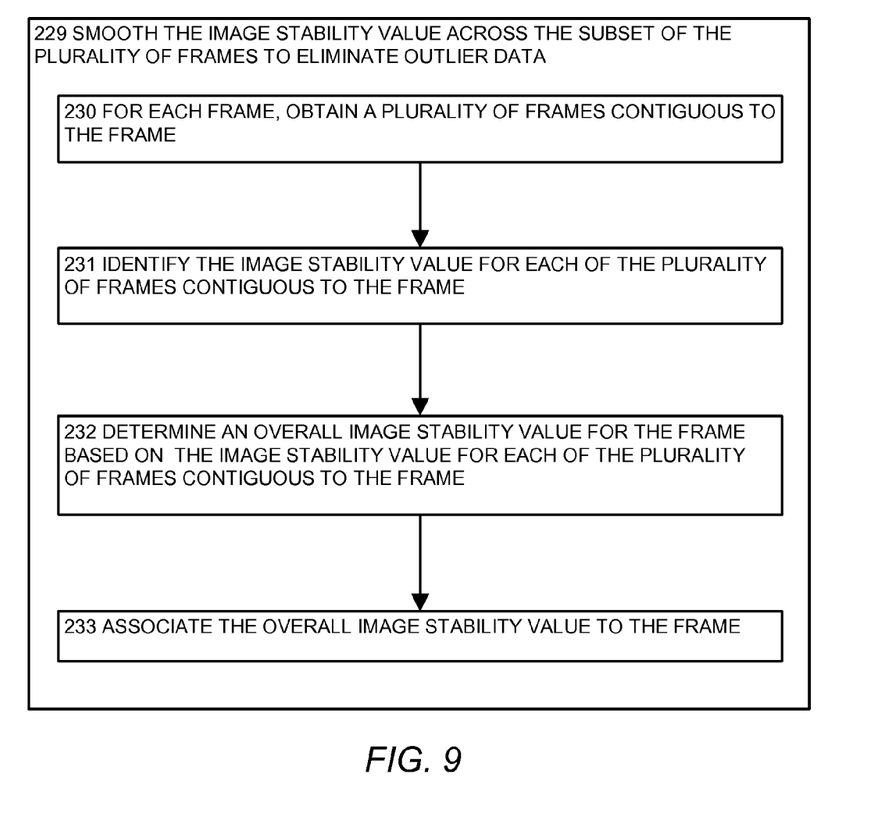
FIG. 9 illustrates a flowchart of a procedure performed by the system of FIG. 1, when the image stability measuring process smoothes the image stability value across the subset of the plurality of frames to eliminate outlier data, according to one embodiment disclosed herein.

FIG. 9 is a continuation of FIG. 8 of an embodiment of the steps performed by image stability measuring process 140-2 when it smoothes the image stability value across the subset of the plurality of frames 150-N to eliminate outlier data.

In step 230, for each frame 150-1, the image stability measuring process 140-2 obtains a plurality of frames 150-N contiguous to the frame 150-1. For example, to determine the image stability value for frame 15, the image stability measuring process 140-2 identifies twenty frames (i.e., frames 5 through 25, not including frame 15) contiguous to frame 15.

In step 231, the image stability measuring process 140-2 identifies the image stability value for each of the plurality of frames 150-N contiguous to the frame 150-1. In other words, the image stability measuring process 140-2 identifies the image stability value for frames 5 through 25 (not including frame 15).

In step 232, the image stability measuring process 140-2 determines an overall image stability value for the frame 150-1 based on the image stability value for each of the plurality of frames 150-N contiguous to the frame 150-1. In other words, the image stability measuring process 140-2 determines the image stability value for frame 15 based on the image stability value associated with each of the frames 5 through 25 (again, not including frame 15).

In step 233, the image stability measuring process 140-2 associates the overall image stability value to the frame 150-1. The image stability measuring process 140-2 then updates the image stability value of frame 15 based on the image stability value determined in step 232.

Figure 10:
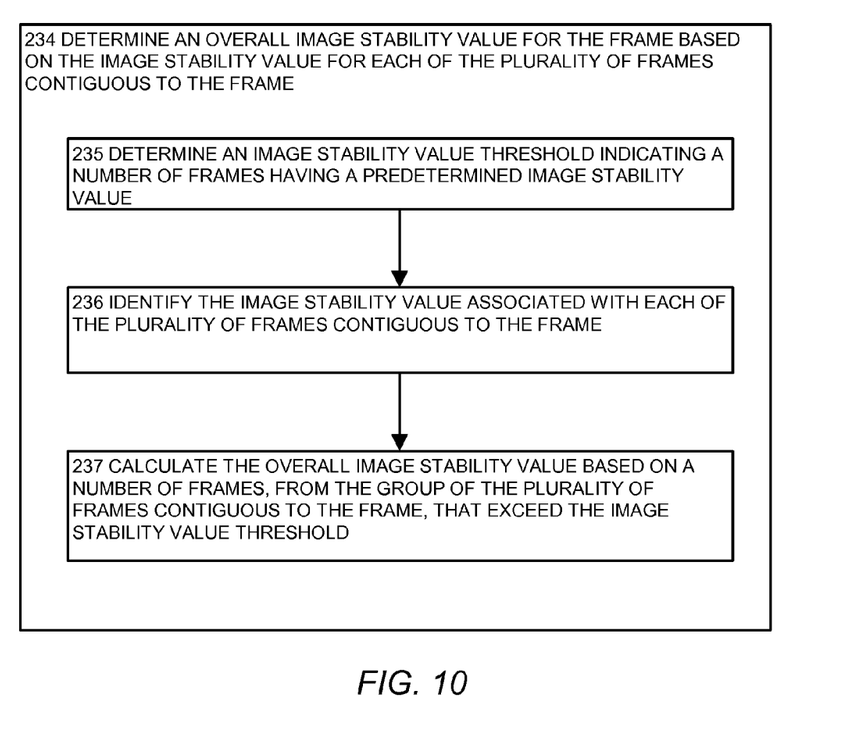
FIG. 10 illustrates a flowchart of a procedure performed by the system of FIG. 1, when the image stability measuring process determines an overall image stability value for the frame based on the image stability value for the frame and the image stability value for each of the plurality of frames contiguous to the frame, according to one embodiment disclosed herein.

FIG. 10 is an embodiment of the steps performed by image stability measuring process 140-2 when it determines an overall image stability value for the frame 150-1 based on the image stability value for each of the plurality of frames 150-N contiguous to the frame 150-1.

In step 234, the image stability measuring process 140-2 determines an overall image stability value for the frame 150-1 based on the image stability value for each of the plurality of frames 150-N contiguous to the frame 150-1. In an example embodiment, the image stability measuring process 140-2 determines the image stability value for frame 15 based on the image stability value associated with each of the frames 5 through 25 (not including frame 15).

In step 235, the image stability measuring process 140-2 determines an image stability value threshold indicating a number of frames 150-N having a predetermined image stability value. For example for the twenty frames 5 through 25 (contiguous to frame 15), the image stability measuring process 140-2 determines that ten frames identified as shaky is the predetermined image stability value, meaning if ten of the twenty frames (i.e., frames 5 through 25) are shaky, then frame 15 will be determined to be shaky.

In step 236, the image stability measuring process 140-2 identifies the image stability value associated with each of the plurality of frames 150-N contiguous to the frame 150-1. In other words, the image stability measuring process 140-2 determines the image stability value for frames 5 through 25 (not including frame 15).

In step 237, the image stability measuring process 140-2 calculates the overall image stability value based on a number of frames 150-N, from the group of the plurality of frames 150-N contiguous to the frame 150-1, that exceed the image stability value threshold. In other words, for example, from the group of frames 5 through 25 (not including frame 15), if ten of those twenty frames are identified as being shaky, frame 15 will be determined to be shaky.

Figure 11:
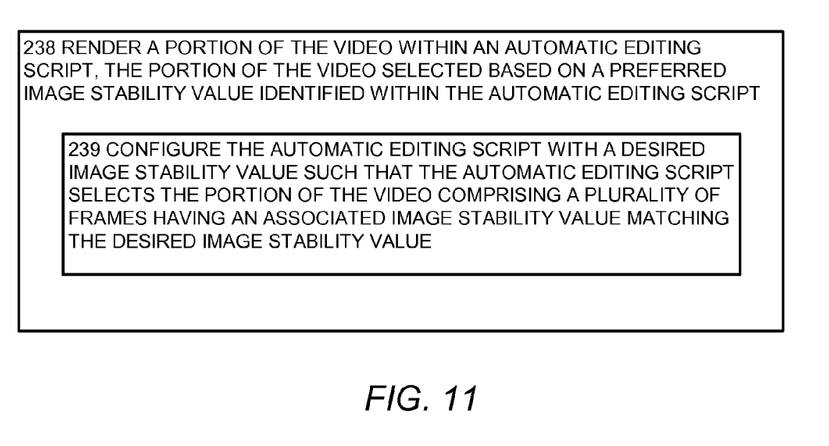
FIG. 11 illustrates a flowchart of a procedure performed by the system of FIG. 1, when the image stability measuring process renders a portion of the video within an automatic editing script, the portion of the video selected based on a preferred image stability value identified within the automatic editing script, according to one embodiment disclosed herein.

FIG. 11 is an embodiment of the steps performed by image stability measuring process 140-2 when it renders a portion of the video 145 within an automatic editing script 160.

In step 238, the image stability measuring process 140-2 renders a portion of the video 145 within an automatic editing script 160. The portion of the video 145 is selected based on a preferred image stability value identified within the automatic editing script 160. The image stability measuring process 140-2 identifies those frames 150-N having an image stability value that corresponds to the automatic editing script 160, and retrieves those frames 150-N for display within the automatic editing script 160. In an example embodiment, the image stability value for each frame is stored within a database, and the automatic editing script 160 obtains those values from the database.

In step 239, the image stability measuring process 140-2 configures the automatic editing script 160 with a desired image stability value such that the automatic editing script 160 selects the portion of the video 145 comprising a plurality of frames 150-N having an associated image stability value matching the desired image stability value. In other words, the automatic editing script 160 may be configured to only retrieve portions of video 145 determined not to be shaky, or portions of video 145 determined to have some image stability or a large amount of image stability.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A non-transitory computer-readable medium comprising program code, comprising:

program code for determining a first plane between a first location of an object on a first frame from a plurality of frames and a second location of the object on a second frame from the plurality of frames;

program code for determining a second plane between the second location and a third location of the object on a third frame from the plurality of frames;

program code for calculating a difference between the first plane and the second plane; and program code for determining whether a change in direction of the object has occurred by at least comparing the difference to a predetermined threshold.

2. The non-transitory computer-readable medium of claim 1, wherein program code for determining whether a change in direction of the object has occurred by at least comparing the difference to a predetermined threshold comprises:
program code for determining that a change in direction of the object has occurred if the difference is greater than the predetermined threshold.

3. The non-transitory computer-readable medium of claim 1, wherein the calculated difference between the first plane and the second plane comprises a number of degrees between the first plane and the second plane.

4. The non-transitory computer-readable medium of claim 1, further comprising:
program code for identifying the predetermined threshold as ninety degrees.

5. The non-transitory computer-readable medium of claim 1, further comprising:
program code for plotting at least one of:
the first location of the object on the first frame;
the second location of the object on the second frame; and
the third location of the object on the third frame.

6. The non-transitory computer-readable medium of claim 1, further comprising:
program code for determining a list of preferred objects from the plurality of frames based at least in part on the frequency in which objects occur across the plurality of frames, wherein the object comprises a preferred object from the list of preferred objects.

7. The non-transitory computer-readable medium of claim 1, further comprising:
program code for maintaining an object counter associated with the object, the object counter identifying a number of times the object exists across the plurality of frames.

8. The non-transitory computer-readable medium of claim 1, further comprising:
program code for determining, after a determination that the change in direction of the object has occurred, an image stability value for a subset of the plurality of frames, the image stability value based at least in part on the change in direction of the object.

9. The non-transitory computer-readable medium of claim 8, wherein the image stability value is based at least in part on the calculated difference between the first plane and the second plane.

10. The non-transitory computer-readable medium of claim 1, wherein program code for determining whether a change in direction of the object has occurred comprises:
program code for determining a change in position of the object from the first frame to the second frame.

11. The non-transitory computer-readable medium of claim 1, wherein the plurality of frames comprise a video and the computer-readable medium further comprises:
program code for rendering a portion of the video within an automatic editing script, the portion of the video selected based on a preferred image stability value identified within the automatic editing script.

12. The non-transitory computer-readable medium of claim 1, further comprising:
program code for determining the second frame from a subset of the plurality of frames, wherein the subset of frames is contiguous to the first frame.

13. The non-transitory computer-readable medium of claim 1, wherein the plurality of frames comprises a sequence of frames, wherein the third frame follows the second frame in the sequence of frames, and wherein the second frame follows the first frame in the sequence of frames.

14. A method, comprising:
receiving a video comprising a plurality of frames;
determining a first plane between a first location of an object on a first frame from the plurality of frames and a second location of the object on a second frame from the plurality of frames;
determining a second plane between the second location and a third location of the object on a third frame from the plurality of frames;
calculating a difference between the first plane and the second plane;
determining whether a change in direction of the object has occurred by at least comparing the difference to a predetermined threshold; and
after a determination that the change in direction of the object has occurred, determining an image stability value for a subset of the plurality of frames based at least in part on the calculated difference.

15. The method of 14, further comprising:
configuring an automatic editing script with a desired image stability value such that the automatic editing script selects a portion of the video comprising a second subset of the plurality of frames having associated image stability values matching the desired image stability value; and
rendering the portion of the video within the automatic editing script.

16. A system comprising:
a memory; and
a processor in communication with the memory, the processor configured for:
receiving a video comprising a plurality of frames;
determining a first plane between a first location of an object on a first frame from the plurality of frames and a second location of the object on a second frame from the plurality of frames;
determining a second plane between the second location and a third location of the object on a third frame from the plurality of frames;
calculating a difference between the first plane and the second plane;
determining whether a change in direction of the object has occurred by at least comparing the difference to a predetermined threshold; and
upon a determination that the change in direction of the object has occurred, determining an image stability value for a subset of the plurality of frames based at least in part on the calculated difference.

17. A non-transitory computer-readable medium comprising program code, comprising:
program code for receiving a plurality of frames;
program code for obtaining a subset of the plurality of frames contiguous to a first frame from the plurality of frames;
program code for identifying, for each frame of the subset, an image stability value for the frame;
program code for determining an overall image stability value for the first frame based at least in part on the identified image stability values; and
program code for associating the overall image stability value to the first frame.

18. The non-transitory computer-readable medium of claim 17, wherein program code for identifying, for each frame of the subset, an image stability value for the frame comprises:
program code for determining, for each frame of the subset, the image stability value for the frame.

19. The non-transitory computer-readable medium of claim 17, wherein program code for determining an overall image stability value for the first frame based at least in part on the identified image stability values comprises:

program code for determining an image stability value threshold; and program code for calculating the overall image stability value based at least in part on a number of frames from the subset that have the identified image stability value for the frame that exceeds the image stability value threshold.

20. A non-transitory computer-readable medium comprising program code, comprising:

program code for receiving a video comprising a plurality of frames;

program code for determining, for each of a first subset of the plurality of frames, an image stability value for the frame;

program code for configuring an automatic editing script with a desired image stability value such that the automatic editing script selects a portion of the video comprising a second subset of the plurality of frames having associated image stability values matching the desired image stability value; and program code for rendering the portion of the video within the automatic editing script.

* * * * *